US010960916B2

(12) United States Patent
Kim et al.

(10) Patent No.: US 10,960,916 B2
(45) Date of Patent: Mar. 30, 2021

(54) COLLAPSIBLE STEERING COLUMN ASSEMBLY

(71) Applicant: ERAE AMS CO., LTD., Daegu (KR)

(72) Inventors: Young-Kwang Kim, Daegu (KR); Duck-Moo Jung, Daegu (KR); Ho Cheol Son, Daegu (KR); Jae Won Jung, Daegu (KR); Min Young Choi, Daegu (KR); Hwan Gong Moon, Daegu (KR); Moo Young Park, Daegu (KR); Se-Hun Jung, Daegu (KR)

(73) Assignee: ERAE AMS CO., LTD., Daegu (KR)

( * ) Notice: Subject to any disclaimer, the term of this patent is extended or adjusted under 35 U.S.C. 154(b) by 0 days.

(21) Appl. No.: 16/863,271

(22) Filed: Apr. 30, 2020

(65) Prior Publication Data
US 2020/0317252 A1 Oct. 8, 2020

Related U.S. Application Data

(63) Continuation of application No. PCT/KR2018/012897, filed on Oct. 29, 2018.

(30) Foreign Application Priority Data

Oct. 31, 2017 (KR) .................. 10-2017-0143577

(51) Int. Cl.
B62D 1/19 (2006.01)
B62D 1/184 (2006.01)
F16B 7/04 (2006.01)

(52) U.S. Cl.
CPC ............. B62D 1/192 (2013.01); B62D 1/184 (2013.01); F16B 7/0406 (2013.01)

(58) Field of Classification Search
CPC ........ B62D 1/102; B62D 1/184; B62D 1/192; B62D 1/195; B62D 1/19; F16B 7/0406
See application file for complete search history.

(56) References Cited

U.S. PATENT DOCUMENTS 5,345,679 A * 9/1994 Lennon ................... B29C 53/06
29/441.1
8,375,822 B2 2/2013 Ridgway et al.
(Continued)

FOREIGN PATENT DOCUMENTS

CN 104494683 A 4/2015
JP 2004-136749 A 5/2004
(Continued)

OTHER PUBLICATIONS

International Search Report for PCT/KR2018/012897 dated Jan. 28, 2019 [PCT/ISA/210].
(Continued)

Primary Examiner — James A English
Assistant Examiner — Kurtis Nielson
(74) Attorney, Agent, or Firm — Sughrue Mion, PLLC

(57) ABSTRACT

A collapsible steering column assembly includes: a mounting bracket having a pair of arms and is configured to be fixed to a vehicle body; a supporting housing which is disposed between the pair of arms to be tiltable about the mounting bracket; a steering column which passes through the supporting housing so as to be able to undergo a tilt motion together with the supporting housing; and a locking device which is configured to be in a locking state or an unlocking state to selectively allow a telescopic motion and a tilt motion of the steering column by selectively applying clamping force to the pair of arms. The steering column comprises an outer jacket, an inner jacket which is slidably inserted into the outer jacket and a tolerance ring which is interposed between the outer jacket and the inner jacket, and the tolerance ring is configured so as to make the inner jacket and the outer jacket move together to realize a telescopic motion in the unlocking state of the locking device and so as to allow the inner jacket to move into the outer jacket by (Continued)

impact in the locking state of the locking device. The tolerance ring is configured to move relative to the outer jacket in a longitudinal direction while the inner jacket collapses into the outer jacket.

7 Claims, 12 Drawing Sheets

(56) References Cited

U.S. PATENT DOCUMENTS

| | | | |
|---|---|---|---|
| 8,403,364 B2 | 3/2013 | Monteil et al. | |
| 8,500,168 B2 | 8/2013 | Goulay et al. | |
| 2004/0104567 A1* | 6/2004 | Kinme | B62D 1/192 |
| | | | 280/777 |
| 2005/0087970 A1* | 4/2005 | Ulintz | F16O 29/002 |
| | | | 280/775 |
| 2006/0097501 A1* | 5/2006 | Yoshimoto | B62D 1/192 |
| | | | 280/777 |
| 2007/0151392 A1* | 7/2007 | Oshita | B62D 1/192 |
| | | | 74/493 |
| 2009/0249916 A1* | 10/2009 | Ridgway | B62D 1/192 |
| | | | 74/492 |
| 2010/0031768 A1* | 2/2010 | Oshita | B62D 1/195 |
| | | | 74/492 |
| 2010/0300238 A1* | 12/2010 | Ridgway | B62D 1/192 |
| | | | 74/493 |
| 2017/0072877 A1* | 3/2017 | Kakita | B62D 1/192 |
| 2018/0347635 A1* | 12/2018 | Kim | B62D 1/20 |
| 2019/0152512 A1* | 5/2019 | Ku | B62D 1/195 |

FOREIGN PATENT DOCUMENTS

| | | |
|---|---|---|
| JP | 2010-036828 A | 2/2010 |
| JP | 2010-188901 A | 9/2010 |
| JP | 2010-254204 A | 11/2010 |
| KR | 10-1010827 B1 | 1/2011 |

OTHER PUBLICATIONS

Written Opinion for PCT/KR2018/012897 dated Jan. 28, 2019 [PCT/ISA/237].

* cited by examiner

FIG. 6
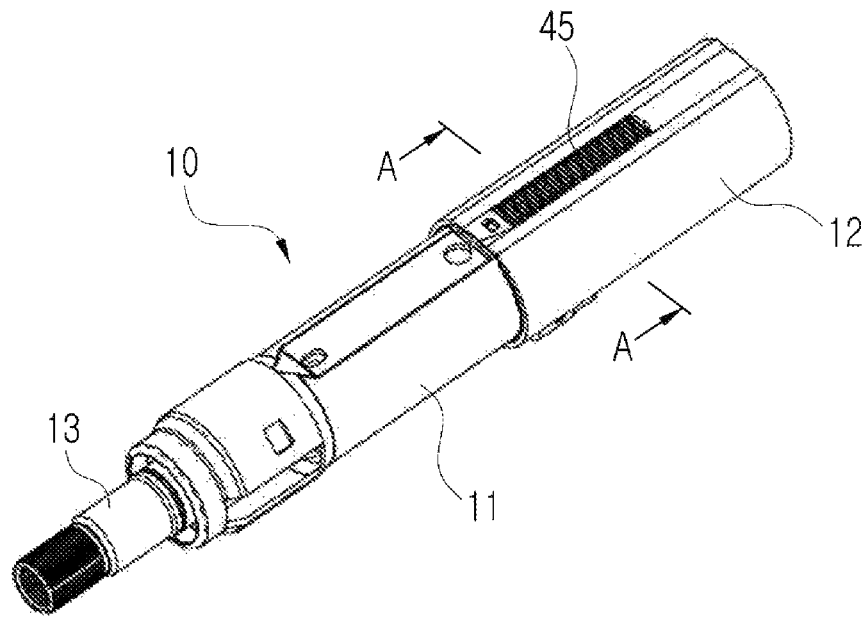
(a)
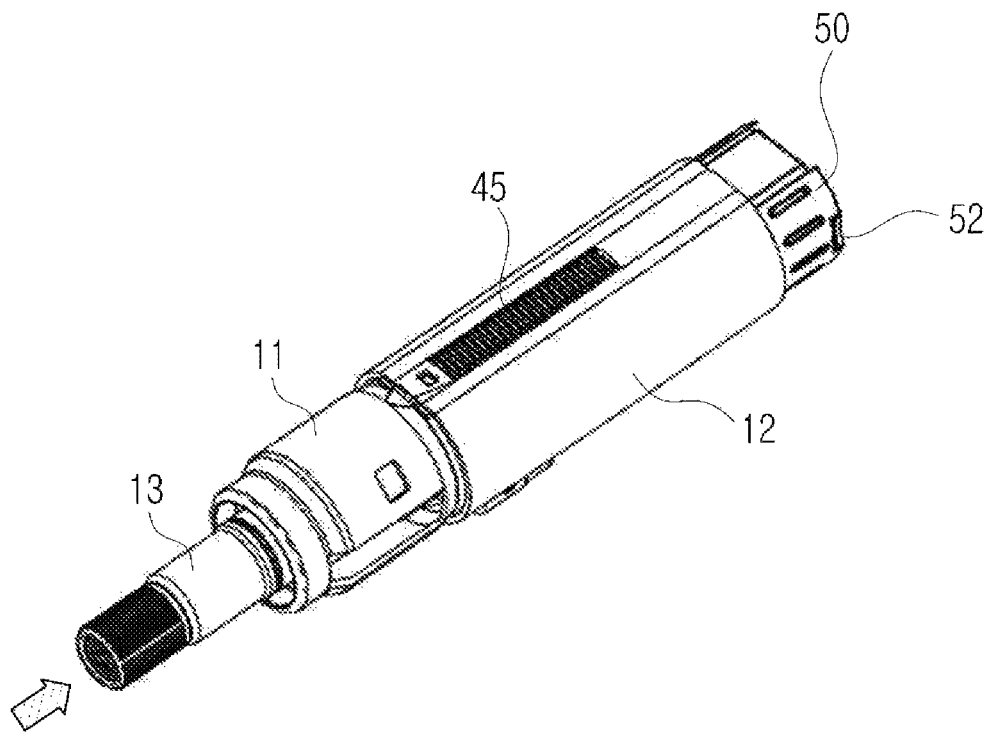
(b)

[FIG. 8]

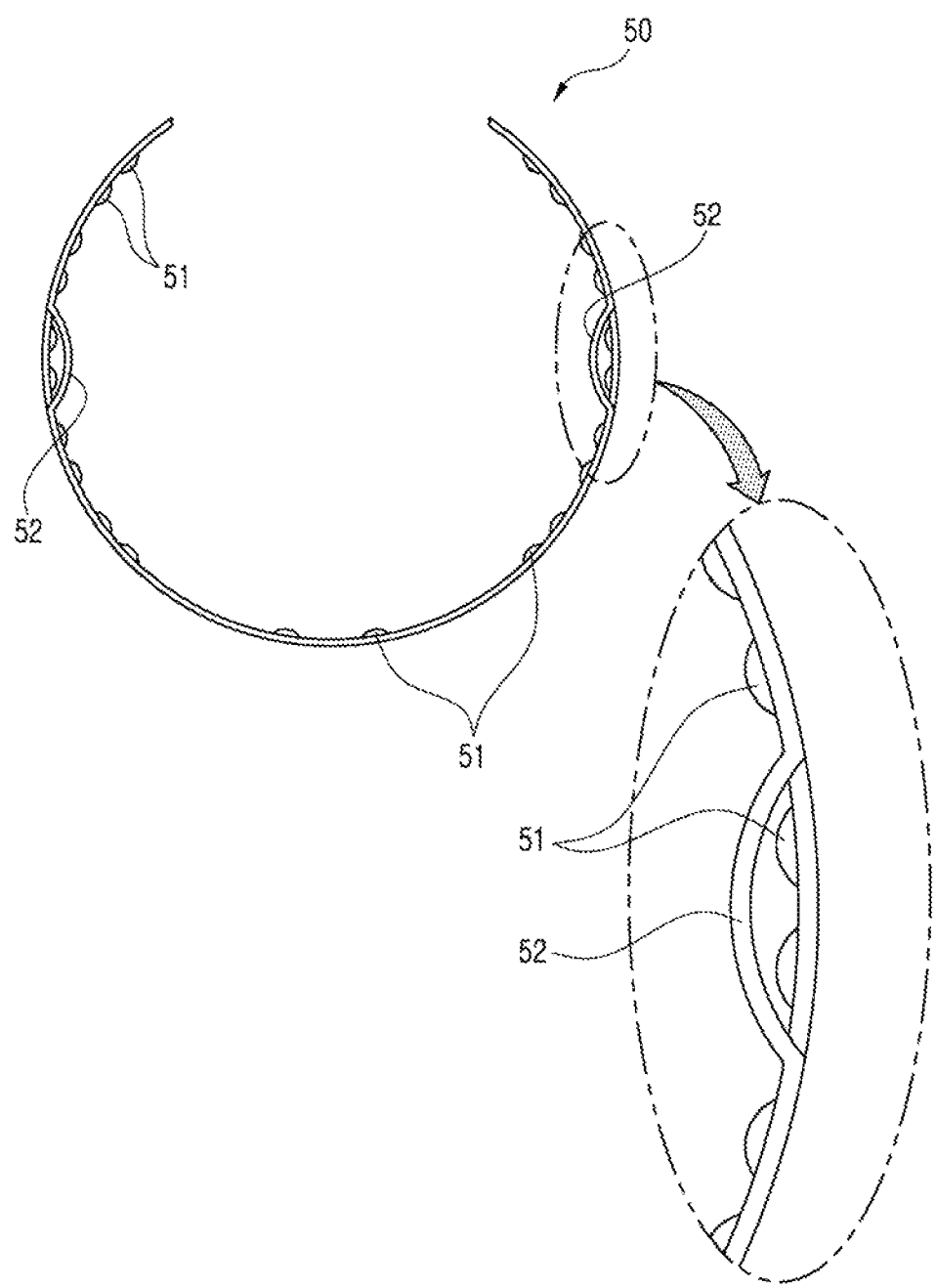
[FIG. 10]

[FIG. 11]
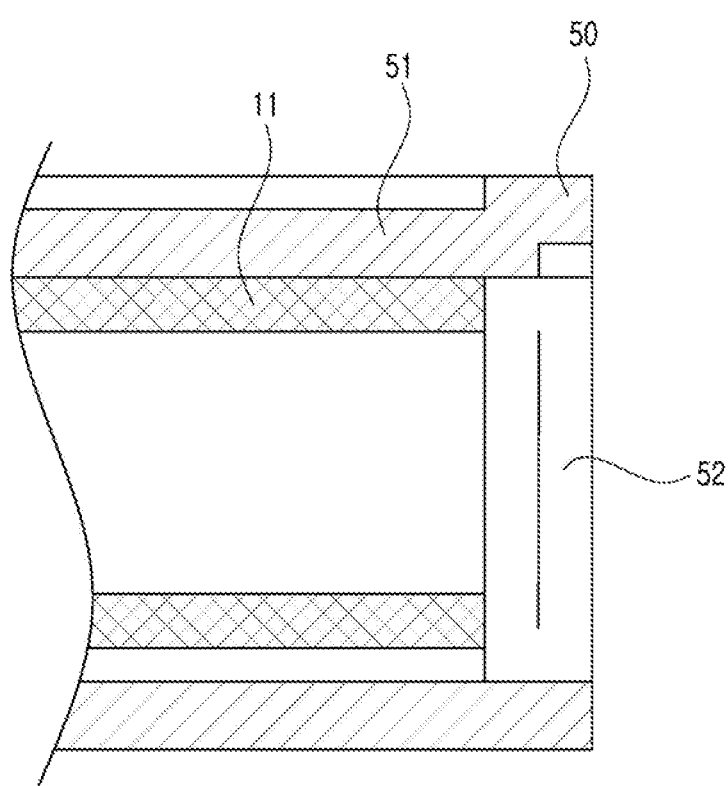

[FIG. 12]
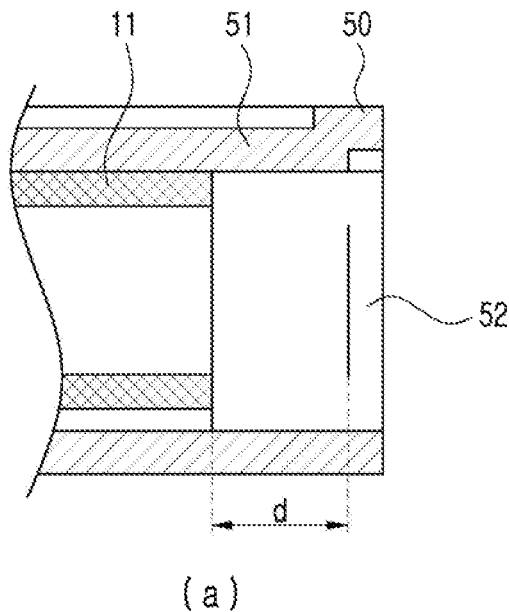
(a)
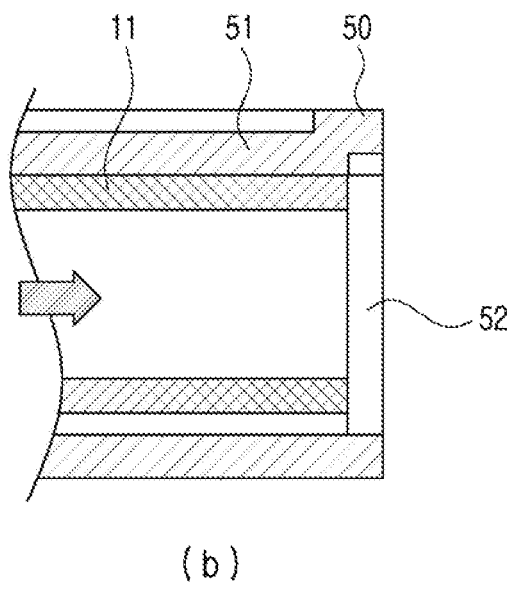
(b)

COLLAPSIBLE STEERING COLUMN ASSEMBLY

TECHNICAL FIELD

The present invention relates to a collapsible steering column assembly which can be collapsed in the event of collision with an energy absorption function.

BACKGROUND ART

A steering column assembly is an apparatus which is connected to a steering wheel to steer in response to a manipulation of a driver. A steering column assembly is generally configured to allow a tilt motion and a telescopic motion for a convenience of a driver. A tilt motion regulates an angular position of a steering wheel, and the telescopic motion regulates a longitudinal position of a steering column. Also, a locking device is provided which selectively allows the tilt motion and the telescopic motion. The tilt motion and the telescopic motion are restricted so as to maintain a position of the steering wheel when the locking device is in a locking state, and the tilt motion and the telescopic motion are allowed when the locking device is in an unlocking state.

A steering column assembly may be configured to be able to be collapsed while absorbing impact energy at the time of impact such a moment of vehicle collision. That is, when a driver crashes into a steering wheel, an inner jacket of a steering column moves into an outer jacket by impact force so that a steering column is collapsed, and during this process impact energy is absorbed. A steering column having this function is generally called a collapsible steering column.

In order to realize such an energy absorption function, various methods such as a method of interposing a tolerance ring between an inner jacket and an outer jacket, a method of using an energy absorption strap, a method of using deformation of locking teeth or the like have been introduced.

A conventional device adopting the tolerance ring has a structure that the tolerance ring is press-fitted between the inner jacket and the outer jacket and slip occurs between an inner surface of the tolerance ring and an outer surface of the inner jacket, and thus jamming and scratch occurs on an outer surface of the inner jacket by friction protrusions formed on an inner surface of the tolerance ring. Such jamming or scratch may deteriorate energy absorption performance of the steering column.

PRIOR ART DOCUMENTS

U.S. Pat. No. 8,375,822 (Date of patent: Feb. 19, 2013)
U.S. Pat. No. 8,403,364 (Date of patent: Mar. 26, 2013)
U.S. Pat. No. 8,500,168 (Date of patent: Aug. 6, 2013)

DETAILED DESCRIPTION OF THE INVENTION

Technical Problem

The present invention has been made in an effort to provide a collapsible steering column assembly which can prevent jamming or scratch on an outer surface of an inner jacket to enhance energy absorption performance by configuring a tolerance ring and an inner jacket to move together during collapse.

Technical Solution

A collapsible steering column assembly according to an embodiment of the present invention includes: a mounting bracket having a pair of arms and is configured to be fixed to a vehicle body; a supporting housing which is disposed between the pair of arms to be tiltable about the mounting bracket; a steering column which passes through the supporting housing so as to be able to undergo a tilt motion together with the supporting housing; and a locking device which is configured to be in a locking state or an unlocking state to selectively allow a telescopic motion and a tilt motion of the steering column by selectively applying clamping force to the pair of arms. The steering column comprises an outer jacket, an inner jacket which is slidably inserted into the outer jacket and a tolerance ring which is interposed between the outer jacket and the inner jacket, and the tolerance ring is configured so as to make the inner jacket and the outer jacket move together to realize a telescopic motion in the unlocking state of the locking device and so as to allow the inner jacket to move into the outer jacket by impact in the locking state of the locking device. The tolerance ring is configured to move relative to the outer jacket in a longitudinal direction while the inner jacket collapses into the outer jacket.

The tolerance ring may be provided with a friction protrusion at an inner surface thereof and is connected to the inner jacket in a state that the friction protrusion contacts an outer surface of the inner jacket.

The tolerance ring may have a blocking portion which is configured to block the inner jacket to move together with the inner jacket while the inner jacket collapses into the outer jacket.

The blocking portion may be a protrusion which is inwardly protruded from an inner surface of the tolerance ring.

The inner jacket and the tolerance ring may be disposed such that a frontal end of the inner jacket contacts the blocking portion in a pre-collapse state of the inner jacket.

The inner jacket and the tolerance ring may be disposed such that a frontal end of the tolerance ring is spaced from the blocking portion by a predetermined distance and the frontal end of the inner jacket may contact the blocking portion while the inner jacket collapses.

An outer surface of the tolerance ring may be formed as a curved surface which does not have a protrusion.

The locking device may include: a lever which is able to rotate between a locking position and an unlocking position; a tilting bolt which is connected to the lever to rotate together with the lever; a cam member which is configured to be able to apply clamping force to the pair of arms in response to rotation of the tilting bolt; a rotating member which is connected to the tilting bolt to rotate together with the tilting bolt; a locking member which is configured to rotate a locking position and an unlocking position by rotation of the rotating member; and a biasing member which provides force to bias the locking member to the locking position.

The cam member may include: a first cam member which is connected to the tilting bolt; and a second cam member which is connected to the first cam member via cam coupling and is supported against an outer surface of the arm of the mounting bracket.

The outer jacket may have a first locking teeth consisting of the teeth coupling. The rotating member may include: a body portion which is connected to the tilting bolt; a pair of legs which are protruded from both ends of the body portion;

and a driving rod which connects the pair of legs. The locking member may include: a slot into which the driving rod is inserted; and a second locking teeth which is configured to be able to be selectively engaged with the first locking teeth.

Advantageous Effects

According to the present invention, since a friction protrusion is formed on an inner surface of a tolerance ring and a tolerance ring moves together with an inner jacket during collapse to move relative to an outer jacket, a slip occurs between a tolerance ring and an inner surface of an outer jacket so as to prevent jamming or scratch which may be caused by a friction protrusion.

BRIEF DESCRIPTION OF DRAWINGS

FIG. 6 is a schematic perspective view of a steering column of a collapsible steering column assembly according to an embodiment of the present invention.

FIG. 10 is a rear elevational view of a tolerance ring of a collapsible steering column assembly according to an embodiment of the present invention.

FIG. 11 shows a pre-collapse state of an inner jacket and a tolerance ring of a collapsible steering column assembly according to an embodiment of the present invention.

FIG. 12 shows a post-collapse state of an inner jacket and a tolerance ring of a collapsible steering column assembly according to an embodiment of the present invention.

DETAILED DESCRIPTION OF THE EMBODIMENTS

Embodiments of the present invention will be described in detail with reference to the accompanying drawings.

Figure 1:
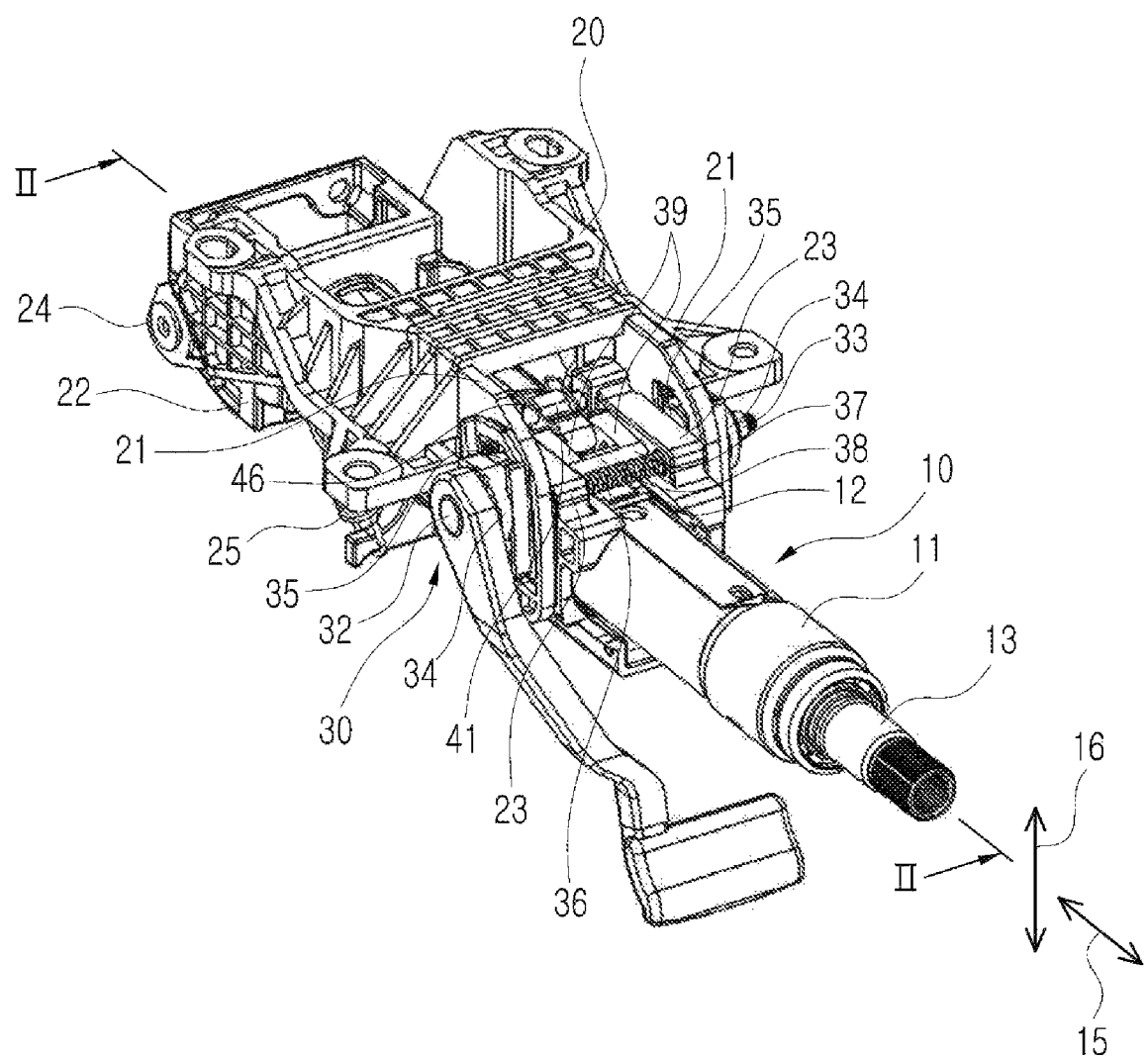
FIG. 1 is a perspective view of a collapsible steering column assembly according to an embodiment of the present invention.
Figure 2:
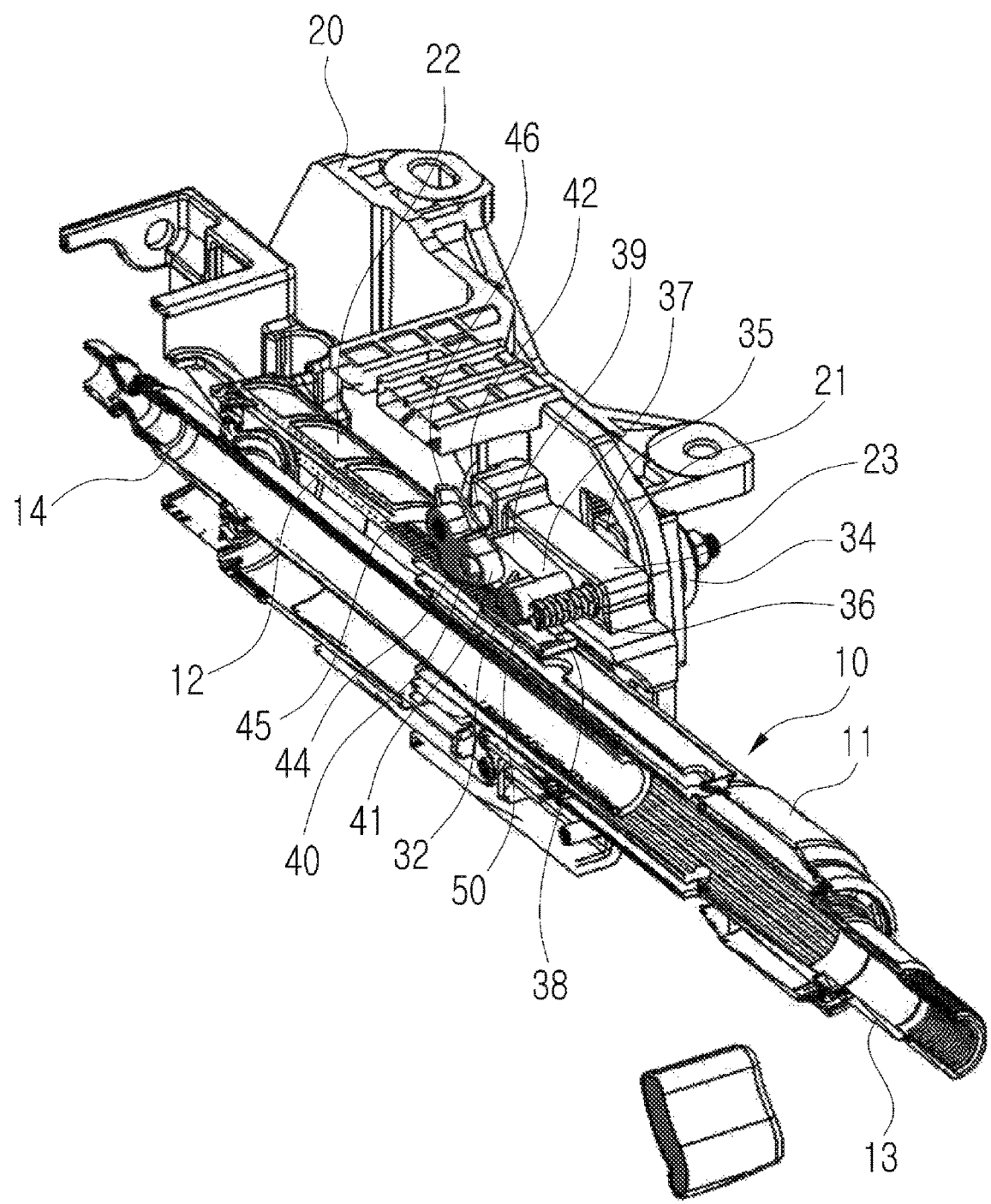
FIG. 2 is a sectional view taken along a line II-II in FIG. 1.

Referring to FIG. 1 and FIG. 2, a collapsible steering column assembly includes a steering column 10. The steering column 10 may include an inner jacket 11 and an outer jacket 12. One end portion of the inner jacket 11 is inserted into the outer jacket 12 to be movable in a longitudinal direction. At this time, a steering wheel (not shown) may be coupled to an end of a steering column, and steering shafts 13 and 14 which are connected to one another to be relatively movable relative to one another may be connected to the inner jacket 11 and the outer jacket 12. When impact force which may cause collapse of a steering column is applied to the steering wheel, the inner jacket 11 may be pushed to move into the outer jacket 12 with the steering shaft 13 so that collapse of the steering column occurs, and during this process energy absorption occurs. This will be again described later.

At this time, as exemplarily shown in FIG. 1, the steering column 10 may be configured to be able to move in a telescopic direction 15 and to be able to tilt in a tilt direction 16.

Meanwhile, as shown in FIG. 1 and FIG. 2, the collapsible steering column assembly includes a mounting bracket 20. The mounting bracket 20 may be configured to be fixed to a vehicle body and may have a pair of arms 21 which face one another. The arms 21 are formed to be elastically deformed in a direction toward one another when external force (clamping force) is applied thereto.

Referring to FIG. 1 and FIG. 2, the collapsible steering column assembly includes a supporting housing 22 which is tiltably connected to the mounting bracket 20. For example, the supporting housing 22 may be connected to the mounting bracket 20 via a tilt shaft 24 to be tiltable. At this time, a tilt direction of the supporting housing 22 may be the same with the tilt direction 16 of the steering column 10. The supporting housing 22 may be a receiving space of a cylindrical shape which is elongated in a longitudinal direction, the steering column 10 may be slidably disposed in the receiving space. A telescopic motion of the steering column 10 may occur by sliding of the steering column 10 within the supporting housing 22, and a tilt motion of the steering column 10 may occur by tilting of the steering column 10 with the supporting housing 22. That is, the steering column 10 may be inserted into the supporting housing 22 to be able to undergo a telescopic motion via a relative movement to the supporting housing 22 and a tilt motion via a tilting movement together with the supporting housing 22.

The supporting housing 22 may include a pair of legs 23 which are formed to be able to face the pair of arms 21 of the mounting bracket 20. As shown in FIG. 1, the pair of legs 23 of the supporting housing 22 may be spaced from one another while respectively contacting inner surfaces of the pair of arms 21 of the mounting bracket 20.

A biasing member 25 for preventing the supporting housing 22 and the steering column 10 which is supported thereto from falling down may be provided. The biasing member 25 may be a coil spring having an elastic resilient force, and one end thereof may be connected to the mounting bracket 20 and the other end thereof may be connected to the supporting housing 22.

As shown in FIG. 1 and FIG. 2, the inner jacket 11 and the outer jacket 12 may pass between the pair of arms 21 of the mounting bracket 20 while passing through the supporting housing 22.

Figure 3:
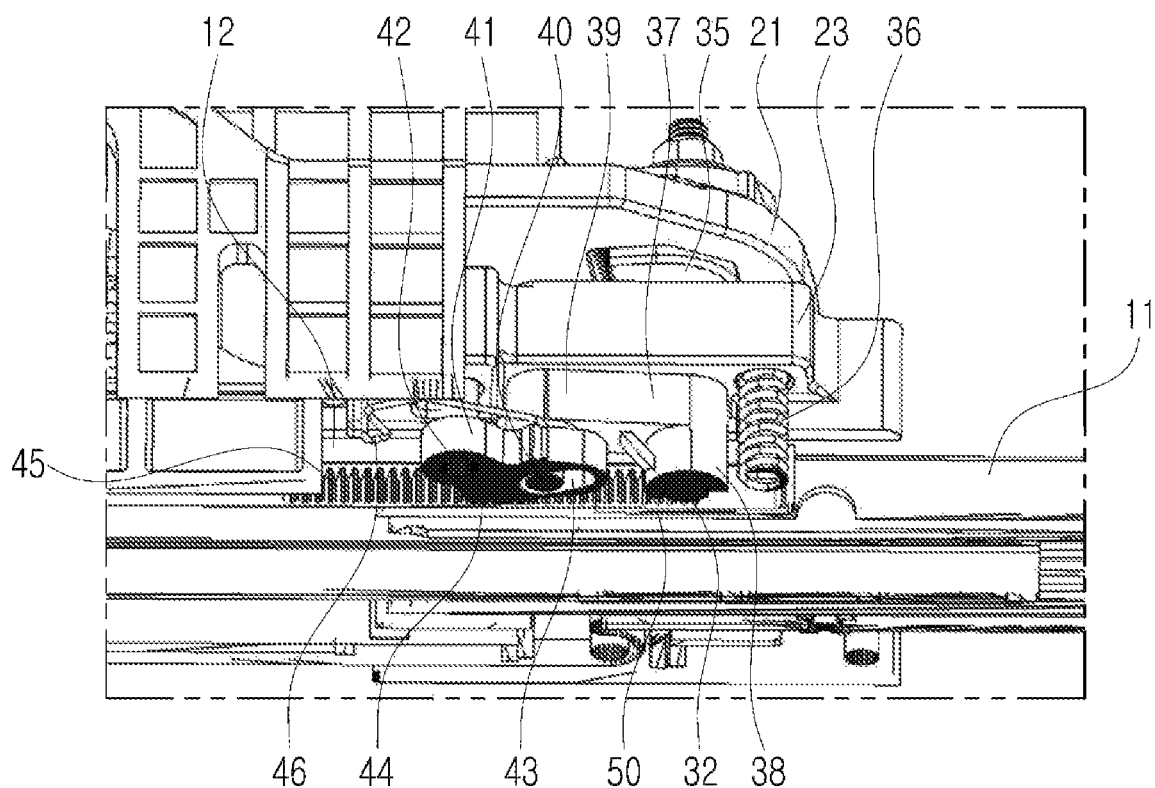
FIG. 3 is an enlarged view of a portion in FIG. 2.

Referring to FIG. 1 to FIG. 3, the collapsible steering column assembly includes a locking device 30 which operates to selectively block or allow a telescopic motion and a tilt motion. The locking device 30 may selectively be in a locking position or an unlocking position, and a telescopic motion and a tilt motion are blocked in the locking position and are allowed in the unlocking position. The locking device 30 is configured to selectively apply clamping force to the pair of arms 21 of the mounting bracket 20 so as to operate to selectively allow the telescopic motion and the tilt motion.

The locking device 30 may include a lever 31 which can rotate between a locking position and an unlocking position and a tilting bolt 32 which is connected to the lever 31 so as to rotate together with the lever 31. The lever 31 may be formed to be rotated by a driver's hand, and the tilting bolt 32 may pass through the pair of arms 21 of the mounting bracket 20 and the pair of legs 23 of the supporting housing 22. The tilting bolt 32 defines a longitudinal axis passing across the pair of arms 21 of the mounting bracket 20 and the pair of legs 23 of the supporting housing 22, and is configured to be able to rotate about this longitudinal axis. At this time, both end portions of the tilting bolt 32 are jutted out from outer side of the first and the second arms 21 of the mounting bracket 20, and the lever 31 may be connected to one end portion and a fixing nut 33 may be connected to the other end portion. Under these configurations, the tilting bolt 32 can rotate about its longitudinal axis by the rotation of the lever 31.

The locking device 30 may include cam members 34 and 35 which are respectively disposed between the arm 21 of the mounting bracket 20 and the lever 31 and between the mounting bracket 20 and the fixing nut 33. The outer cam member 34 may be connected to the tilting bolt 32 to rotate together with the tilting bolt 32, and the inner cam member 35 may be connected to the tilting bolt 32 to be able to move in a longitudinal axis thereof. The outer cam member 34 and the inner cam member 35 have cam surfaces respectively, and if the tilting bolt 32 rotates to the locking position, the inner cam member 35 is pushed by the outer cam member 34 to move toward the arm 21 of the mounting bracket 20. That is, when the locking device 30 is in the locking state, the arm 21 of the mounting bracket 20 and the leg 23 of the supporting housing 22 are pressurized by clamping force of the cam member 35 to be contracted inwardly, and accordingly the outer jacket 12 and the inner jacket 11 are sequentially pressurized so that the telescopic motion and the tilt motion can be blocked. That is, the arms 21 of the mounting bracket 20 is inwardly contracted by the clamping force in the locking state so as to pressurize the legs 23 and accordingly the legs 23 of the supporting housing 22 are also inwardly contracted to tightly contact an outer surface of the outer jacket 12. Thereby, a telescopic movement of the outer jacket 12 within the supporting housing 22 so that a telescopic motion of the steering column 10 is blocked, and a tilt of the supporting housing 22 is also blocked so that a tilt motion of the steering column 10 is also blocked.

A return spring 36 for assisting returning of the pair of legs 23 of the supporting housing 22 to their original position during the conversion from the locking state to the unlocking state may be provided. The return spring 36 may be set to elastically outwardly support the pair of legs 23.

The locking device 30 may further include a structure for selectively blocking movement of the outer jacket 12 in a telescopic direction. For this, the locking device 30 may include a rotating member 37 which is connected to the tilting bolt 32 so as to rotate with the tilting bolt 32 about a longitudinal axis of the tilting bolt 32. As shown in FIG. 1, the rotating member 37 may be disposed between the pair of arms 21 of the mounting bracket 20. The rotating member 37 may include a body portion 38 which is elongated along a longitudinal axis of the tilting bolt 32 and through which the tilting bolt 32 passes, a first and a second legs 39 which are protruded from both ends of the body portion 38 and a driving rod 40 which connects the two legs 39.

Figure 5:
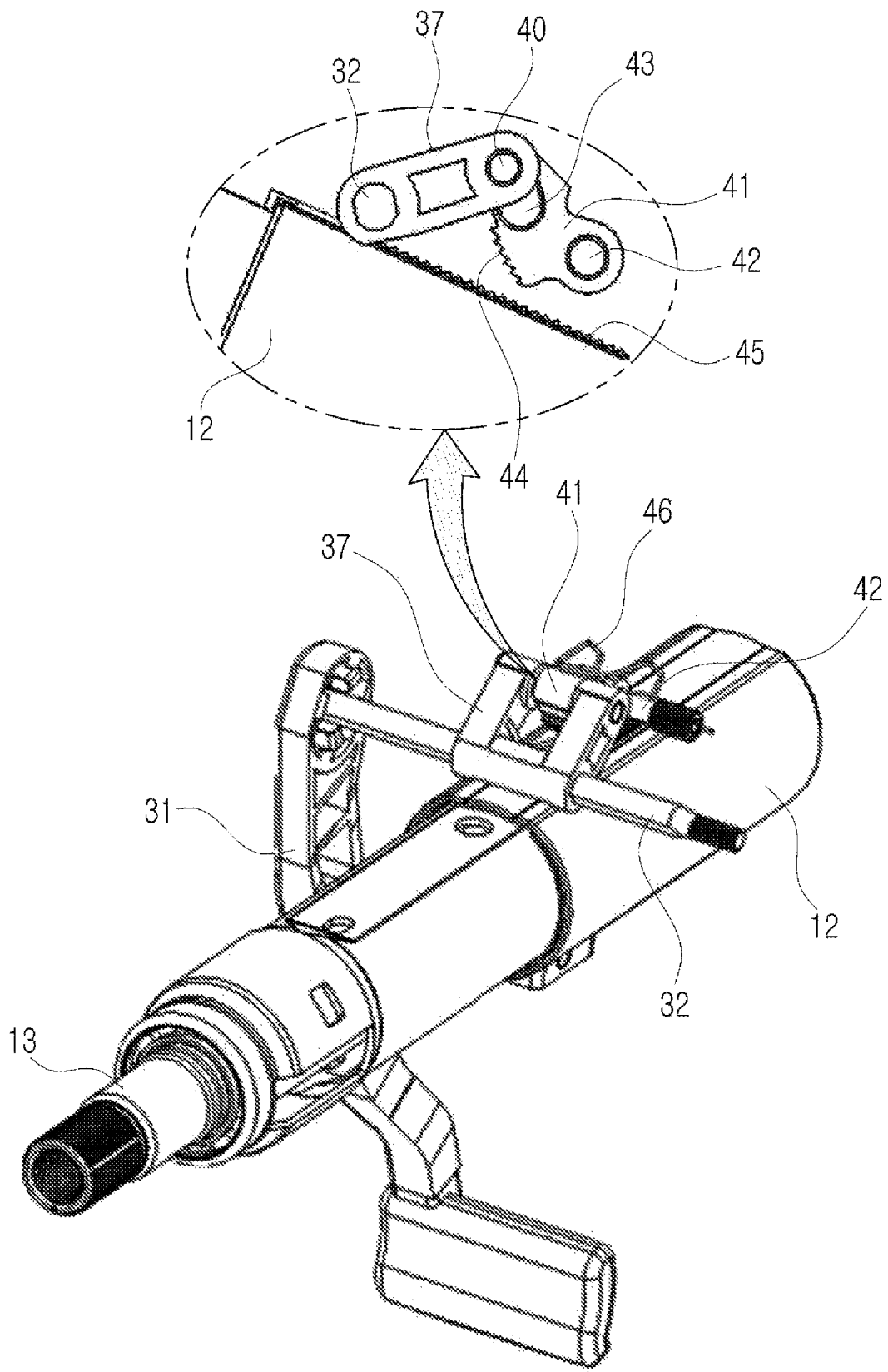
FIG. 5 illustrates an unlocking state of a telescopic motion in a collapsible steering column assembly according to an embodiment of the present invention.

Also, the locking device 30 may include a locking member 41 for a locking function. The locking member 41 is configured to be operated by the rotating member 37 and is disposed between the pair of arms 21 of the mounting bracket 20 in the vicinity of the rotating member 37. The locking member 41 is rotatably connected to a connecting rod 42 which is connected respectively to the pair of legs 23 of the supporting housing 22. Referring to FIG. 5, the locking member 41 may have a slot 43 into which the driving rod 40 of the rotating member 37 is inserted, and the slot 43 may be formed to be larger than the driving rod 40. If the rotating member 37 rotates in a clockwise in FIG. 3 about the tilting bolt 32 by the rotation of the lever 31, the locking member 41 rotates in a counter-clock wise in FIG. 3 about the connecting rod 42 by the driving rod 40.

Locking teeth (first locking teeth) 45 are formed on an outer surface of the outer jacket 12, and correspondingly the locking member 41 has locking teeth (second locking teeth) 44. If the locking teeth 44 of the locking member 41 and the locking teeth 45 of the outer jacket 12 are engaged with one another, movement of the outer jacket 12 along a longitudinal direction is blocked, and if two teeth 44 and 45 are disengaged, the blocking of the movement of the outer jacket 12 in a longitudinal direction is removed.

The locking device 30 may include a biasing member 46 which provides a biasing force to urge the locking member 41 to be in the locking state. For example, the biasing member 46 may be formed of material having an elastic resilient force, and the biasing member 46 provides a biasing force by elastically supporting the locking member 41 to be in the locking position by an elastic resilient force as shown in FIG. 1 to FIG. 3.

A tolerance ring 50 may be interposed between the inner jacket 11 and the outer jacket 12. The tolerance ring 50 is disposed to contact the outer circumferential surface of the inner jacket 11 and an inner circumferential surface of the outer jacket 12 to generate friction force therebetween which urges the inner jacket 11 and the outer jacket 12 to move together during a telescopic motion. Meanwhile, during the collapse of the steering column, the tolerance ring 50 performs an energy absorption function while allowing the inner jacket 11 to move into the outer jacket 12.

Figure 4:
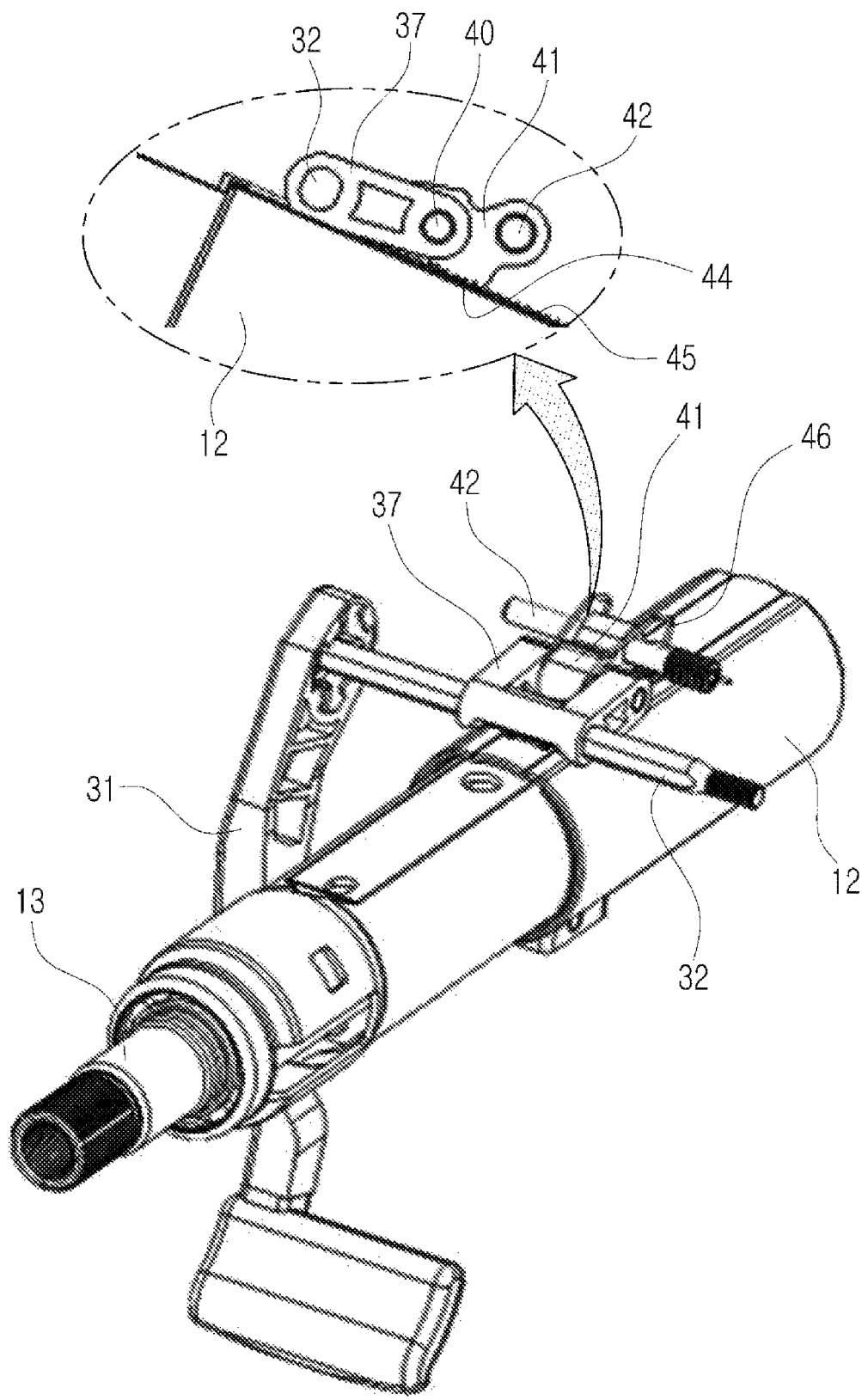
FIG. 4 illustrates a locking state of a telescopic motion in a collapsible steering column assembly according to an embodiment of the present invention.

Referring to FIG. 4 and FIG. 5, locking function by teeth engagement of the locking device 30 will be described in more detail. FIG. 4 shows the locking state by teeth engagement, and FIG. 5 shows the unlocking state by teeth disengagement. Referring to FIG. 4, when the lever 31 is in the locking position, the rotating member 37 and the locking member 41 are in the locking position shown in FIG. 4 and thereby the locking teeth 44 of the locking member 41 and the locking teeth 45 of the lower jacket 12 are engaged with one another so that a movement of the outer jacket 12 is blocked. That is, in the locking state of the locking device 30, since the locking teeth 45 and the locking teeth 44 are engaged with one another, a movement of the outer jacket 12 in a telescopic direction is additionally blocked in addition to the locking of the telescopic motion by the clamping force of the locking device in the locking state. Meanwhile, referring to FIG. 5, when the lever 31 is rotated to the unlocking position, the rotating member 37 rotates about the tilting bolt 32 to raise the locking member 41 and thus the locking teeth 44 of the locking member 41 is disengaged from the locking teeth 44 of the outer jacket 12 so that a telescopic movement of the outer jacket 12 is allowed.

A tolerance ring according to an embodiment of the present invention will be described in detail with reference to FIG. 6 to FIG. 10.

Figure 7:
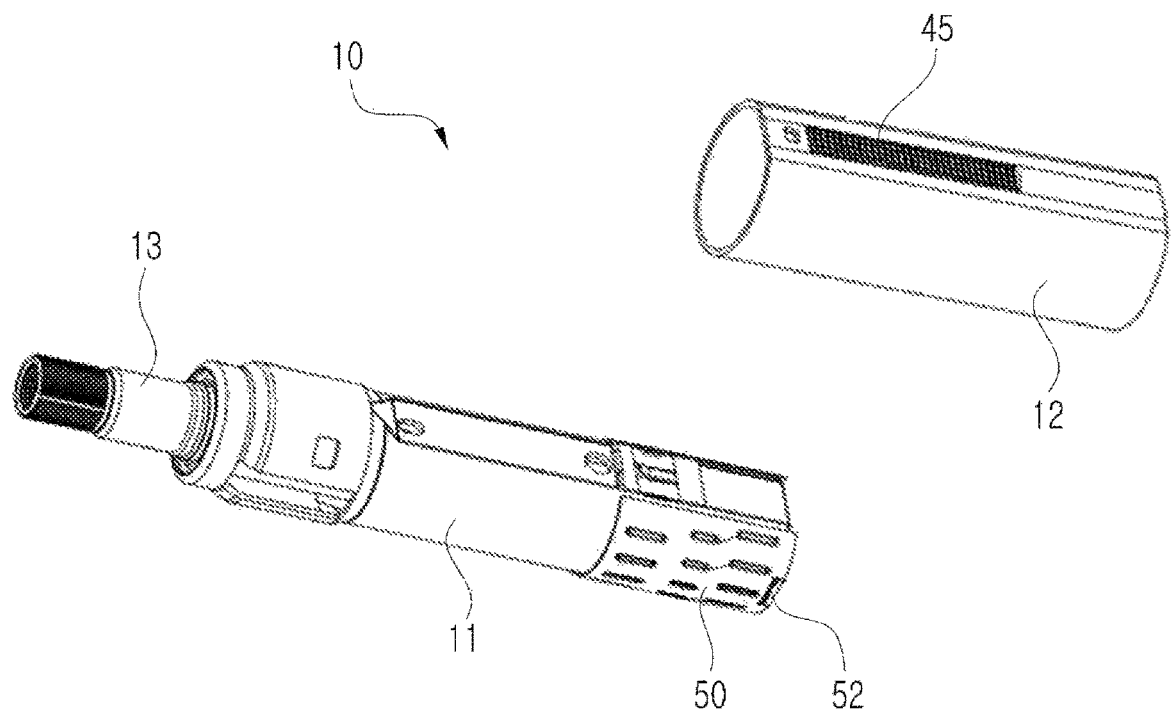
FIG. 7 is a perspective view of a steering column in which an outer jacket is disassembled.

Referring to (a) of FIG. 6 and FIG. 7, a frontal end portion of the inner jacket 11 of the steering column 10 is inserted into the outer jacket 12, and the tolerance ring 50 is interposed between the inner jacket 11 and the outer jacket 12. For example, the tolerance ring 50 and the inner jacket 11 are previously assembled as shown in FIG. 7, and then the outer jacket 12 may be press-fitted. In (b) of FIG. 6 a state after the inner jacket 11 is collapsed (movement in a direction of an arrow) is shown, and the tolerance ring 50 may move relative to the outer jacket 12 in a longitudinal direction during collapse. For example, the tolerance ring 50 moves together with the inner jacket 11 during collapse, and thereby relative movement of the tolerance ring 50 with respect to the outer jacket 12 in a longitudinal direction may occur.

Figure 8:
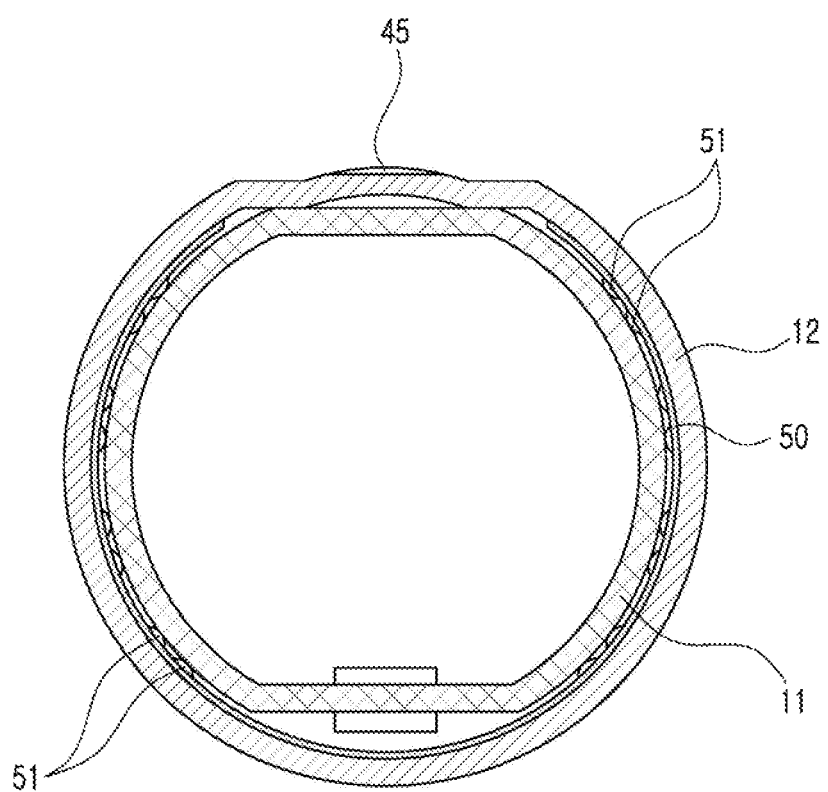
FIG. 8 is a sectional view taken along a line A-A in FIG. 1.
Figure 9:
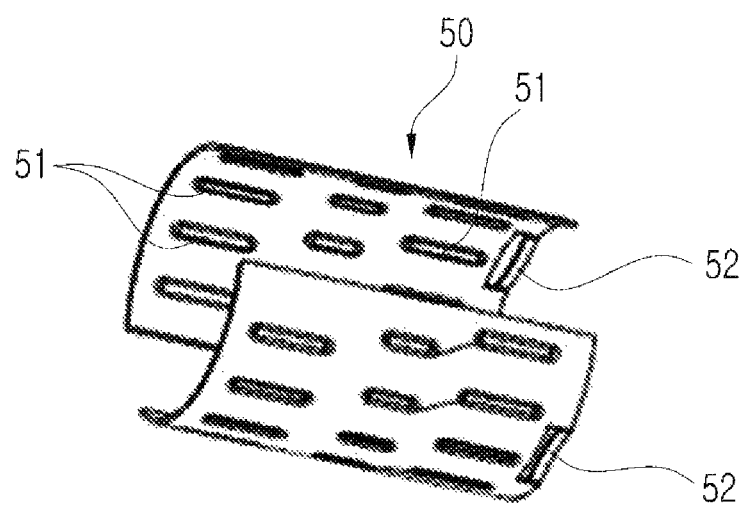
FIG. 9 is a perspective view of a tolerance ring of a collapsible steering column assembly according to an embodiment of the present invention.

Referring to FIG. 7 to FIG. 9, the tolerance ring 50 may have approximately a shape of a cylindrical ring, and may be partially removed if needed.

Referring to FIG. 8 and FIG. 9, the tolerance ring 50 may have friction protrusions 51, and is assembled to the inner jacket 11 in a state that the friction protrusions 51 contact an outer surface of the inner jacket 11. The friction protrusion 51 may be provided in a plurality and may be elongated in a longitudinal direction of the inner jacket 11. At this time, an outer surface of the tolerance ring 50 may be formed as a curved surface which does not have protrusions. Since the friction protrusion 51 is formed on an inner surface of the tolerance ring 50 and an outer surface thereof is formed as a curved surface without protrusions, the inner jacket 11 and the tolerance ring 50 slide together by the friction protrusion 51 during collapse and a slip between the tolerance ring 50 and the outer jacket 12 may occur. Further, since the friction protrusion 51 is formed on an inner surface of the tolerance ring 50, the inner jacket 11 and the tolerance ring 50 are previously assembled and then can easily be inserted into the outer jacket 121, so as to enhance an assembling property.

Meanwhile, in an embodiment of the present invention, in order to secure more surely the co-movement of the inner jacket 11 and the tolerance ring 50 during collapse, the tolerance ring 50 may have a blocking portion 52. As shown in FIG. 10, the blocking portion 52 may be a protrusion which is inwardly protruded from an inner surface of the tolerance ring 50. While the inner jacket 11 collapses, a frontal end thereof is blocked against the blocking portion 52 so that the tolerance ring 50 moves together with the inner jacket 11. For example, the blocking portion 52 may be provided at a frontal end portion of the tolerance ring 50.

At this time, referring to FIG. 11, a frontal end (right end in FIG. 11) of the inner jacket 11 may contact the blocking portion 52 in a pre-collapse state of the inner jacket 11. Accordingly, the inner jacket 11 and the tolerance ring 50 moves together from a starting time of collapse of the inner jacket 11.

FIG. 12 shows another embodiment of the present invention. In an embodiment shown in FIG. 12, a frontal end of the inner jacket 11 is spaced from the blocking portion 52 by a predetermined distance d in a pre-collapse state of the inner jacket 11. Accordingly, the inner jacket 11 is not blocked by the blocking portion 52 at an initial stage of collapse, but after the inner jacket 11 moves by the distance d, the inner jacket 11 is blocked against the blocking portion 52 of the tolerance ring 50 so as to move together with the tolerance ring 50. Due to this structure energy absorption of two steps can be realized.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

The present invention relates to a steering column assembly of a vehicle, so it has an industrial applicability.

The invention claimed is:

1. A collapsible steering column assembly comprising:
    a mounting bracket having a pair of arms and is configured to be fixed to a vehicle body;
    a supporting housing which is disposed between the pair of arms to be tiltable about the mounting bracket;
    a steering column which passes through the supporting housing so as to be able to undergo a tilt motion together with the supporting housing; and
    a locking device which is configured to be in a locking state or an unlocking state to selectively allow a telescopic motion and a tilt motion of the steering column by selectively applying clamping force to the pair of arms,
    wherein the steering column comprises an outer jacket, an inner jacket which is slidably inserted into the outer jacket and a tolerance ring which is interposed between the outer jacket and the inner jacket,
    wherein the tolerance ring is configured so as to make the inner jacket and the outer jacket move together to realize a telescopic motion in the unlocking state of the locking device and so as to allow the inner jacket to move into the outer jacket by impact in the locking state of the locking device,
    wherein the tolerance ring is configured to move relative to the outer jacket in a longitudinal direction while the inner jacket collapses into the outer jacket,
    wherein the tolerance ring has a blocking portion which is configured to block the inner jacket to move together with the inner jacket while the inner jacket collapses into the outer jacket, and
    wherein the inner jacket and the tolerance ring are disposed such that a frontal end of the inner jacket contacts the blocking portion in a pre-collapse state of the inner jacket.

2. The collapsible steering column assembly of claim 1, wherein the tolerance ring is provided with a friction protrusion at an inner surface thereof and is connected to the inner jacket in a state that the friction protrusion contacts an outer surface of the inner jacket.

3. The collapsible steering column assembly of claim 2, wherein an outer surface of the tolerance ring is formed as a curved surface which does not have a protrusion.

4. The collapsible steering column assembly of claim 1, wherein the blocking portion is a protrusion which is inwardly protruded from an inner surface of the tolerance ring.

5. The collapsible steering column assembly of claim 1, wherein the locking device comprises:
    a lever which is able to rotate between a locking position and an unlocking position;
    a tilting bolt which is connected to the lever to rotate together with the lever;
    a cam member which is configured to be able to apply clamping force to the pair of arms in response to rotation of the tilting bolt;
    a rotating member which is connected to the tilting bolt to rotate together with the tilting bolt;
    a locking member which is configured to rotate a locking position and an unlocking position by rotation of the rotating member; and
    a biasing member which provides force to bias the locking member to the locking position.

6. The collapsible steering column assembly of claim 5, wherein the cam member comprises:
    a first cam member which is connected to the tilting bolt; and a second cam member which is connected to the first cam member via cam coupling and is supported against an outer surface of the arm of the mounting bracket.

7. The collapsible steering column assembly of claim 5, wherein the outer jacket has a teeth coupling including a first locking teeth, and
wherein the rotating member comprises:
a body portion which is connected to the tilting bolt;
a pair of legs which are protruded from both ends of the body portion; and
a driving rod which connects the pair of legs,
and wherein the locking member comprises:
a slot into which the driving rod is inserted; and
a second locking teeth which is configured to be able to be selectively engaged with the first locking teeth.

\* \* \* \* \*